(12) United States Patent
Kinjo

(10) Patent No.: US 7,453,491 B2
(45) Date of Patent: Nov. 18, 2008

(54) SHOOTING EQUIPMENT COMMUNICATING SYSTEM

(75) Inventor: Naoto Kinjo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 906 days.

(21) Appl. No.: 10/401,706

(22) Filed: Mar. 31, 2003

(65) Prior Publication Data
US 2003/0184654 A1 Oct. 2, 2003

(30) Foreign Application Priority Data
Mar. 29, 2002 (JP) ............................ 2002-132117

(51) Int. Cl.
H04N 7/00 (2006.01)
H04N 7/18 (2006.01)
H04N 9/47 (2006.01)
H04N 5/225 (2006.01)
H04N 9/04 (2006.01)

(52) U.S. Cl. .................. 348/118; 348/148; 348/207.99; 348/207.1

(58) Field of Classification Search ................. 348/118, 348/148, 207.99, 207.1, 207.11, 837
See application file for complete search history.

(56) References Cited

U.S. PATENT DOCUMENTS

| | | | | |
|---|---|---|---|---|
| 5,296,884 A * | 3/1994 | Honda et al. | ................. | 396/311 |
| 5,506,644 A * | 4/1996 | Suzuki et al. | ................. | 396/319 |
| 6,023,241 A * | 2/2000 | Clapper | ................. | 342/357.13 |
| 6,222,583 B1 * | 4/2001 | Matsumura et al. | ......... | 348/113 |
| 6,282,362 B1 * | 8/2001 | Murphy et al. | ................. | 386/46 |
| 6,396,537 B1 * | 5/2002 | Squilla et al. | ................. | 348/239 |
| 6,522,889 B1 * | 2/2003 | Aarnio | ..................... | 455/456.5 |
| 6,657,661 B1 * | 12/2003 | Cazier | ..................... | 348/231.2 |
| 6,741,864 B2 * | 5/2004 | Wilcock et al. | .......... | 455/456.1 |
| 6,903,763 B1 * | 6/2005 | Noguchi et al. | ........ | 348/207.99 |
| 6,914,626 B2 * | 7/2005 | Squibbs | ................... | 348/231.3 |
| 7,007,243 B2 * | 2/2006 | Baldino | ...................... | 715/853 |
| 7,088,389 B2 * | 8/2006 | Shibasaki et al. | ........... | 348/239 |
| 7,123,295 B2 * | 10/2006 | Baron et al. | ............. | 348/231.2 |
| 7,248,285 B2 * | 7/2007 | Needham | ................. | 348/207.1 |
| 2001/0055373 A1 * | 12/2001 | Yamashita | ............... | 379/90.01 |
| 2003/0184654 A1 * | 10/2003 | Kinjo | ..................... | 348/207.1 |

FOREIGN PATENT DOCUMENTS

JP 2000-105431 4/2000

* cited by examiner

*Primary Examiner*—David Ometz
*Assistant Examiner*—Richard M Bemben
(74) *Attorney, Agent, or Firm*—Sughrue Mion, PLLC

(57) ABSTRACT

The shooting equipment communicating system includes portable shooting equipment and mobile communications equipment which are moved together and communicate with each other. The mobile communications equipment includes a database section for storing map data, location information about regions and sites included in a map and region-/site-related information identified by the location information, and a retrieving section for retrieving the relevant region-/site-related information depending on the input location information, and transmits the retrieved region-/site-related information to the portable shooting equipment. The portable shooting equipment includes a shooting section for performing photography shooting of a subject and a storage section for receiving and storing the retrieved region-/site-related information.

17 Claims, 5 Drawing Sheets

SHOOTING EQUIPMENT COMMUNICATING SYSTEM

BACKGROUND OF THE INVENTION

This invention relates to a shooting equipment communicating system which can acquire information about regions and sites located at a destination while the system user is traveling in a vehicle and other means for transport or performing photography shooting with a camera at the destination.

In recent years, there has been a widespread use of a digital still camera (hereinafter referred to simply as a digital camera) equipped with a display which converts a still picture to a digital signal for recording of the picture by using a CCD (charge coupled device) instead of a film. The display of a digital camera can display pictures taken after photography shooting and display picture information recorded onto a recording medium such as a Memory Stick™, a SmartMedia™ and a flexible disk, as well as serve as a monitor during photography shooting.

For example, the JP 2000-105431 A discloses a print system which records information about a shooting site to enhance the taste, entertainment and convenience of photography shooting, information about the target of shooting, and picture information and text information such as entertainment information onto a recording medium including an IC memory and a flexible disk, and which displays on a display the picture information and text information recorded onto the recording medium during photography shooting.

However, the print system disclosed in the JP 2000-105431 A has a problem that it is necessary to request a printing agency to record the above-mentioned various information onto a recording medium prior to shooting. That is, acquisition of information is cumbersome according to the print system.

The storage capacity of a recording medium is limited so that it can hold only a certain amount of information. Thus it is impossible to acquire detailed and to-the-point information and up-to-date information at a destination.

The above-mentioned print system identifies a subject through pattern recognition thus acquiring information about the subject. The pattern recognition requires a high-performance CPU so that it is impossible to acquire information about a subject without using a digital camera equipped with a high-performance CPU.

In particular, it is impossible to acquire, as required, information about a subject under photography shooting at a sightseeing spot during a trip.

SUMMARY OF THE INVENTION

The invention has been accomplished in order to solve the aforementioned problems and aims at providing a shooting equipment communicating system which can easily acquire information to enhance the taste, entertainment and convenience of photography shooting, e.g., information about a subject under photography shooting at a sightseeing spot of a destination.

In order to attain the object described above, the present invention provides a shooting equipment communicating system including portable shooting equipment and mobile communications equipment which is moved together with the portable shooting equipment and communicates with the portable shooting equipment, wherein:

the mobile communications equipment comprises:

a database section for storing map data, location information about regions and sites included in a map represented by the map data, and region-/site-related information about the regions and the sites identified by the location information; and a retrieving section for retrieving the relevant region-/site-related information from the database section depending on the input location information; and transmits the region-/site-related information retrieved by the retrieving section to the portable shooting equipment; and the portable shooting equipment comprises a shooting section for performing photography shooting of a subject and a storage section for receiving and storing the region-/site-related information retrieved by the retrieving section.

Preferably, the portable shooting equipment further comprises a position information acquiring section for acquiring information on a current position and transmits acquired position information at least as shooting information to the mobile communications equipment when the photography shooting is performed with the shooting section; and the mobile communications equipment further comprises a processor section for identifying a shooting site on the photography shooting with the shooting section by using the shooting information received and the map data and inputting the shooting site as the location information to the retrieving section, wherein the retrieving section retrieves the region-/site-related information from the database section depending on the location information about the shooting site input from the processor section and transmits the region-/site-related information about the shooting site retrieved to the portable shooting equipment.

Preferably, the portable shooting equipment transmits data on pictures taken by the shooting section to the mobile communications equipment, and the mobile communications equipment stores in the database section data on pictures of a subject of shooting previously photographed from a specified site as registered picture data in association with the location information, identifies the shooting site and the subject of shooting on the photography shooting with the shooting section by comparing the data on pictures taken with the registered picture data, retrieves on the retrieving section the region-/site-related information about the identified shooting site and subject of shooting, and transmits the information retrieved to the portable shooting equipment.

Further, preferably, the mobile communications equipment communicates with an external server, the region-/site-related information is product information in the region or at the site, the mobile communications equipment transmits product order input data to the portable shooting equipment together with the product information, and on completion of the product order input data received, the portable shooting equipment returns the product order input data to the mobile communications equipment, and the mobile communications equipment transfers the completed product order input data to the external server.

Preferably, the mobile communications equipment further comprises a storage section, the portable shooting equipment transmits the data on pictures taken by the shooting section or the completed product order input data to the mobile communications equipment, and the mobile communications equipment stores the data on pictures taken by the shooting section or the completed product order input data in the storage section.

Further, preferably, the mobile communications equipment transfers the data on pictures or the completed product order input data stored in the storage section to the external server.

Further, preferably, the mobile communications equipment communicates with an external server comprising an external database section and performs addition to, or deletion of, or update of the region-/site-related information stored in the database section, based on information contained in the external database section that is transmitted from the external server.

Preferably, the mobile communications equipment is car-mounted communications equipment or portable communications equipment which is capable of communicating with the portable shooting equipment.

And, preferably, the car-mounted communications equipment is a car navigation device and the portable communications equipment is a cell phone, hand-held computer or PDA (personal digital assistant) with a navigation function.

Further, preferably, the portable shooting equipment is adapted for a short-distance communication with the mobile communications equipment.

Further, preferably, the portable shooting equipment is moved together with the mobile communications equipment or moved as being kept within a range in which the short-distance communication with the mobile communications equipment is feasible.

Preferably, the portable shooting equipment further comprises a first storage control section for controlling the storage section such that contents information, which is stored in the database section of the mobile communications equipment or acquired by the mobile communications equipment from the external server through communication, is received from the mobile communications equipment and stored in the storage section depending on a storage capacity of the storage section and that the contents information stored in the storage section depending on the storage capacity of the storage section is deleted or compressed at a high compression ratio to store over again as the photography shooting of a subject with the shooting section of the portable shooting equipment proceeds, so that a free space for storing data on taken pictures, which is acquired by performing the photography shooting of a subject, is provided.

And, preferably, the first storage control section controls the storage section such that the data on taken pictures stored in the storage section is deleted or compressed at high compression ratio to store over again after being transmitted to the mobile communications equipment so as to store new contents information in the storage section.

Preferably, the mobile communications equipment further comprises a second storage control section for controlling the database section such that contents information acquired from an external server through communication is stored in the database section depending on a storage capacity of the database section and that the contents information stored in the database section depending on the storage capacity of the database section is deleted or compressed at a high compression ratio to store over again as the mobile communications equipment is moved, so that a free space for storing data on taken pictures received from the portable shooting equipment and/or contents information received from the external server is provided.

And, preferably, the second storage control section controls the database section such that the data on taken pictures stored in the database section is deleted or compressed at high compression ratio to store over again after being transmitted to the external server so as to store new contents information in the database section.

DETAILED DESCRIPTION OF THE INVENTION

The shooting equipment communicating system of the invention is described below in detail with reference to the preferred embodiments shown in the accompanying drawings.

To begin with, we describe a first embodiment of the invention.

The first embodiment of the invention is a shooting equipment communicating system whereby the user of the system travels to a destination (e.g. a sightseeing spot) in a vehicle and acquires information about the destination while he/she is traveling.

Figure 1:
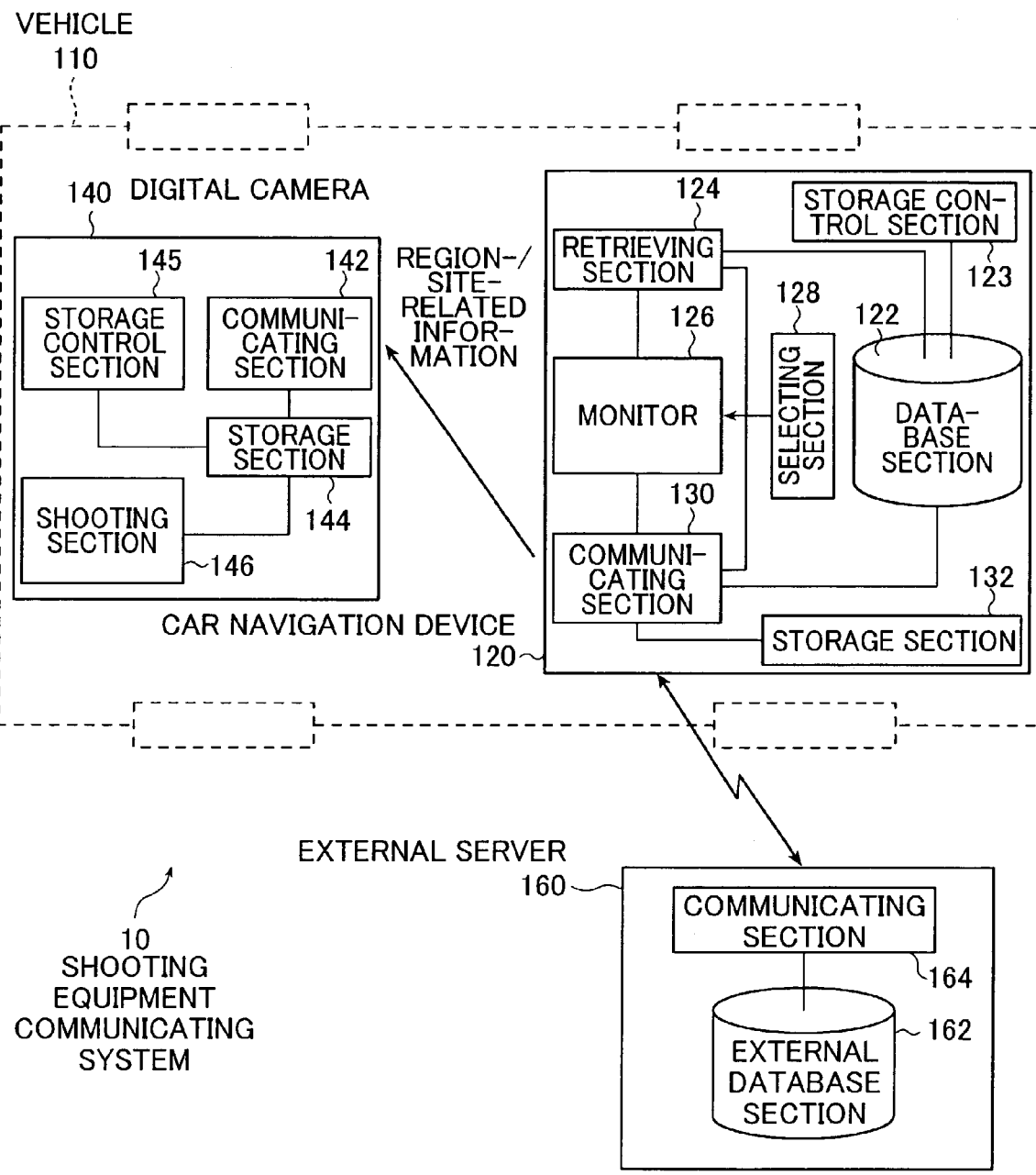
FIG. 1 is a block diagram showing the outline of an example of a shooting equipment communicating system according to a first embodiment of the invention.

FIG. 1 is an exemplary block diagram showing the outline of a shooting equipment communicating system 10 according to the first embodiment of the invention.

The shooting equipment communicating system 10 as shown in FIG. 1 comprises a vehicle 110, a car navigation device 120, a digital camera 140 and an external server 160.

The vehicle 110 is means for traveling to a destination such as a sightseeing spot. The vehicle 110 is for example a family car or a sightseeing bus although the invention is not limited thereto. The vehicle 110 may also be a train, a taxi, or a motorcycle.

The car navigation device 120 is mobile communications equipment of the invention as corresponding to car-mounted communications equipment and is mounted on the vehicle 110.

The car navigation device 120 is a known device equipped with a system for guiding the vehicle to a destination while displaying the current position of the vehicle 110 in a map displayed on the monitor by using the GPS and/or a terrestrial magnetic field sensor.

The car-mounted communications equipment used in the invention is not limited to the car navigation device 120 but may be any device or equipment including a computer used for other applications as long as it is mounted on the vehicle 110 and has a navigation function or navigation system similar to that of the car navigation device 120.

Moreover, the mobile communications equipment used in the invention is not limited to car-mounted communications equipment such as the car navigation device 120 but may be any device or equipment carried by those who carry the digital camera 140 for photography shooting as long as it has a navigation function or navigation system similar to that of the car navigation device 120. For instance, the mobile communications equipment may be a device or equipment adapted for other applications including a handheld computer and a PDA (personal digital assistant), a wearable computer, as well as a wearable navigation device. Naturally, the mobile communications equipment has an ample storage capacity because not only data on pictures taken by the portable shooting equipment but also region-/site-related information concerning a destination or a place of photography shooting and registered picture data are stored in it as the database. The storage capacity of the mobile communications equipment is comparable to that of the portable shooting equipment.

The car navigation device 120 comprises a database section 122 for storing map data, location information about the regions and sites included in a map represented by the map data, and region-/site-related information about regions and sites identified by this location information, a retrieving section 124 for retrieving the corresponding region-/site-related information from the database section 122 depending on the input site information and data amount, a monitor 126 for displaying a map represented by the map data as well as regions and sites included therein, a selecting section 128 for selecting as site information an arbitrary site/region in a map displayed on the monitor and setting the data amount to be searched through by the retrieving section 124, a communicating section 130 for communicating with at least a digital camera 140, transmitting the region-/site-related information retrieved by the retrieving section 124 to the digital camera 140 and receiving data on pictures taken by the digital camera 140, and a storage section 132 for storing data on pictures taken by the digital camera 140.

The communicating section 130 can communicate with the digital camera 140, communicate at a short distance for special preference, and in addition with an external server 160. The communicating section 130 receives region-/site-related information from the external server 160 and transfers picture data transmitted from the digital camera 140 to the external server 160.

Communications between the car navigation device 120 and the digital camera 140 via the communicating section 130 may be wireless or wired communications. In case the digital camera 140 is used outside the vehicle 110, the wireless communications are used. Preferably, wireless communications are performed with the external server 160.

The car navigation device 120 mentioned above has a function to retrieve region-/site-related information about regions and sites at the destination, in addition to guiding of the vehicle 110 to the destination while displaying a map of the current position and course of the vehicle 110 on the monitor 126, once the user of this system has selected the destination on the selecting section 128.

The region-/site-related information is for example information about natural objects including mountains, lakes, rivers, animals and plants, buildings, sightseeing places, and events at the destination such as a sightseeing spot or within a certain range covering the destination.

Preferably, the region-/site-related information stored in the database section 122 is given a rank represented by its importance and stored in a hierarchical structure of ranks of importance so that the retrieving section 124 may search through the information in the data amount set by the selecting section 128 in order of importance.

Preferably, a wide or narrow range of regions and sites retrieved by the retrieving section 124 in accordance with the regions and sites input as location information is selected by the selecting section 128.

Preferably, a wide or narrow range of regions and sites retrieved by the retrieving section 124 is selected by the selecting section 128 in accordance with the set data amount.

The digital camera 140 is used as the portable shooting equipment in the invention. The digital camera 140, which is moved together with the mobile communications equipment such as the car navigation device 120 or moved as being kept within the range in which the short-distance communication with the mobile communications equipment is feasible and has a function to communicate with the mobile communications equipment such as the car navigation device 120, preferably at a short distance, is a camera which uses a CCD instead of a film and converts a still picture to digital signals for subsequent recording. The digital camera 140 used in the invention may be any digital camera having such a shooting function as of a known digital camera as long as it has a communication function.

The portable shooting equipment used in the invention is not limited to the digital camera 140 but may be any device or equipment as long as it has a photography shooting function and a communication function and is moved together with the mobile communications equipment or moved as being kept within the range in which the short-distance communication with the mobile communications equipment is feasible. For instance, the portable shooting equipment may be a cell phone having a photography shooting function, a PDA having a photography shooting function and a communication function, or again, a digital video camera which has a communication function and converts analog signals representing a taken image and voice to digital signals for subsequent recording and reproduction.

The digital camera 140 comprises a communicating section 142 for communicating with the car navigation device 120, a storage section 144 for storing region-/site-related information retrieved by the car navigation device 120, and a shooting section 146 for shooting a subject. The shooting section 146 has a display for displaying pictures taken and region-/site-related information.

The digital camera 140 has a function to provide the user of the system with region-/site-related information retrieved by a car navigation device 120 by communicating with the car navigation device 120 mounted on the vehicle 110.

The external server 160 is installed in a chain store such as a convenience store which sells general merchandise and foods, a fast food store, a family restaurant, and a gas station, or near a road such as at the entrance of a tunnel or on a median strip. The external server 160 comprises an external database section 162 for storing region-/site-related information and a communicating section 164 for communicating with the car navigation device 120.

The region-/site-related information stored in the external database section 162 is up-to-date and detailed information about the regions and sites where external servers 164 are installed. The car navigation device 120 can add, delete or update the region-/site-related information stored in the database section 122 by communicating with the external server 160.

The communicating section 164 can preferably transfer the information such as picture data to for example a printing agency such as a processing laboratory where an image processor and a printer to prepare prints based on picture data are installed.

The shooting equipment communicating system 10 according to the first embodiment of the invention is basically arranged as described above.

The operation of the first embodiment is described below.

When the system user selects as location information on the selecting section 128 the regions and sites at the destination e.g. a sightseeing spot from the map displayed on the monitor 126 while he/she is traveling toward the destination e.g. the sightseeing spot by using the car navigation device 120, the retrieving section 124 retrieves the region-/site-related information identified by the input of regions and sites as location information from the database section 122.

For example, in case Odawara (one sightseeing spot in Japan) is selected, information about Odawara displayed on the monitor is retrieved. In case a wide or narrow range of regions and sites to be retrieved is selected on the selecting section 128, the information related to a certain range of regions such as Odawara, Hakone, Manazuru and Yugawara (each being one of the sightseeing spots in Japan) is retrieved.

In case not only the location information to be retrieved by the retrieving section 124 but the data amount to be retrieved is set on the selecting section 128, the retrieving section 124 retrieves the set data amount of region-/site-related information in order of importance from the database section 122 where said information is stored as a hierarchical structure of ranks of importance. Preferably, the above range of regions and sites are changed depending on the data amount to be retrieved.

The region-/site-related information retrieved by the retrieving section 124 is transmitted to the digital camera 140 via the communicating section 130.

The communicating section 142 of the digital camera 140 receives the region-/site-related information transmitted from the car navigation device 120. The received region-/site-related information is stored in the storage section 144.

The system user can perform the above processing in the vehicle 110 while traveling to a destination. Thus, the system user is guided to the destination while using the car navigation device 120 and the digital camera 140 has stored the region-/site-related information about the destination before or when he/she gets off the vehicle. The system user can then display desired information selected from the region-/site-related information stored in the storage section 142 on the display of the shooting section 146 thus enhancing the taste, entertainment and convenience of photography shooting.

For example, in case an event is held at the destination, the system user can reference the information about the place and date/time of the event to participate in or watch the event, which adds to convenience.

The system user can acquire the highlight and characteristics of the event to enhance the taste and entertainment of the photography shooting in the event.

Preferably, the region-/site-related information about the event acquired is compounded with the data on pictures taken by the shooting section 146 in photography shooting in the event.

Preferably, when the system user has dropped into a chain store such as a convenience store where an external server 160 is installed on the way to the destination, the car navigation device 120 receives on the communicating section 130 the region-/site-related information stored into the external database section 162 via the communicating section 164 and add, delete or update the region-/site-related information stored in the database section 122 of the car navigation device 120. By communicating with the external server 160 on the move, it is possible to acquire the detailed and up-to-date region-/site-related information stored in the external database section 162.

When the system user has dropped into a gas station or a convenience store where the external server 160 is installed on the way back home, if wishing to order printing of pictures taken, the system user may transmit to the external server 160 the data on pictures taken by the shooting section 146 of the digital camera 140, transmitted to the car navigation device 120 and stored in the storage section 132 together with order data, and transfer via the external server 160 the picture data and order data to a printing agency such as a processing laboratory where an image processor and a printer to prepare prints based on picture data and order data are installed.

In this way, according to the first embodiment of the invention, it is possible to readily acquire the region-/site-related information on the way to a destination in a vehicle thus enhancing the taste, entertainment and convenience of photography shooting. Further, it is possible to acquire the region-/site-related information in the data amount which depends on the memory capacity of the storage section 144 of the digital camera 140.

We now describe a second embodiment of the invention.

The second embodiment is a shooting equipment communicating system which provides the system user with information used in photography shooting at a destination after he/she has traveled to the destination such as a sightseeing spot in a vehicle.

Figure 2:
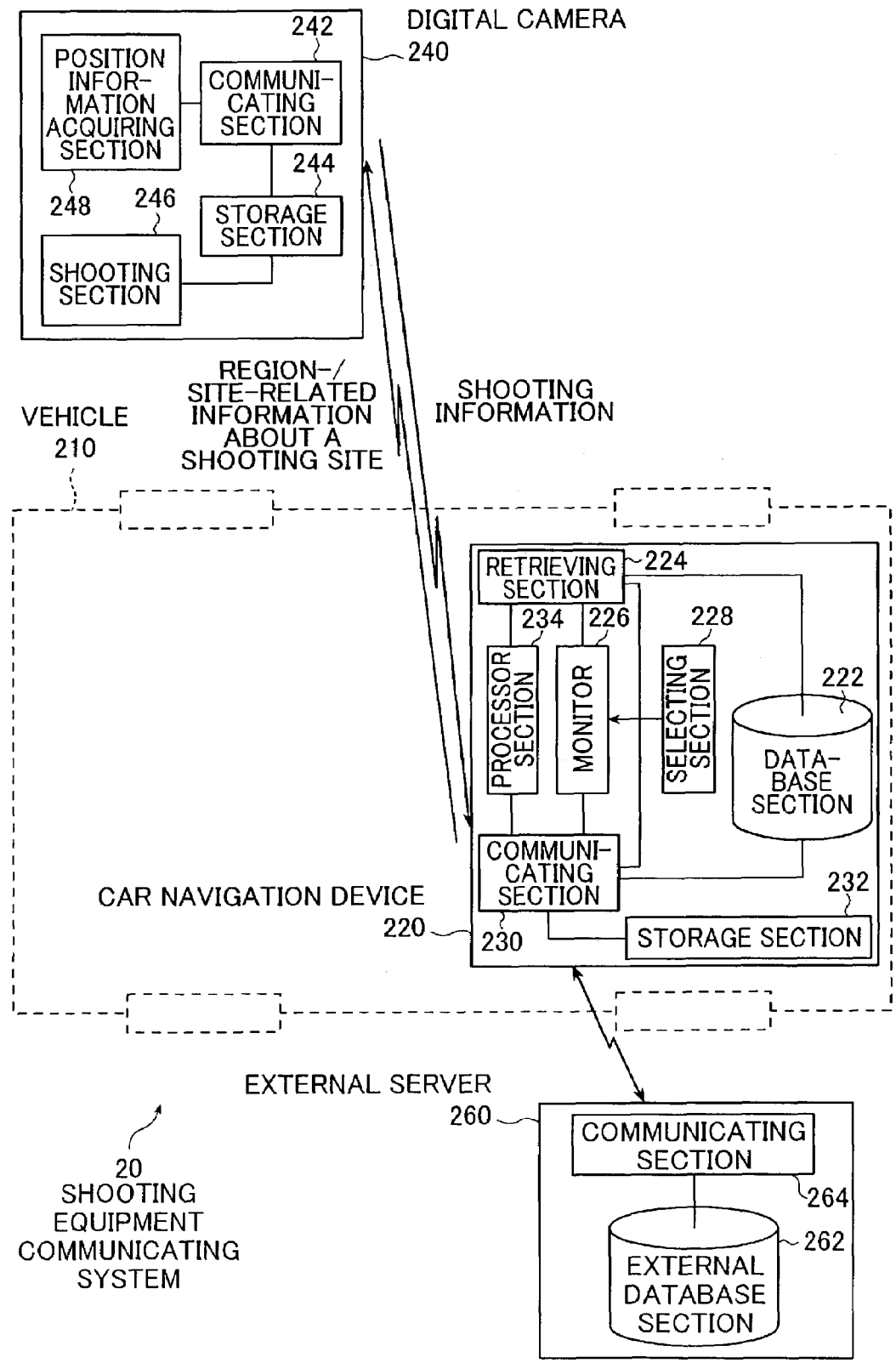
FIG. 2 is a block diagram showing the outline of an example of a shooting equipment communicating system according to a second embodiment of the invention.

FIG. 2 is an exemplary block diagram showing the outline of a car-mounted shooting equipment communicating system 20 according to the second embodiment of the invention.

The shooting equipment communicating system 20 as shown in FIG. 2 comprises a vehicle 210, a car navigation device 220, a digital camera 240 and an external server 260.

Configuration and functions of the vehicle 210, the car navigation device 220, the digital camera 240 and the external server 260 of the shooting equipment communication system 20 as shown in FIG. 2 are generally the same as those of the vehicle 110, the car navigation device 120, the digital camera 140 and the external server 160 of the shooting equipment communicating system 10 as shown in FIG. 1, respectively. A database section 222, a retrieving section 224, a monitor 226, a selecting section 228, a communicating section 230 and a storage section 232 of the car navigation device 220 in FIG. 2 are equivalent to the database section 122, the retrieving section 124, the monitor 126, the selecting section 128, the communicating section 130 and the storage section 132 of the car navigation device 120 in FIG. 1, respectively. A communicating section 242, a storage section 244 and a shooting section 246 of the digital camera 240 in FIG. 2 are equivalent to the communicating section 142, the storage section 144 and the shooting section 146 of the digital camera 140 in FIG. 1, respectively. Thus, description on the same configurations and functions is omitted and only the difference is described below.

The shooting equipment communicating system 20 is a system to acquire the region-/site-related information at the shooting site by transmitting to the car navigation device 220 the shooting information including at least the information about the position where pictures are being taken by the system user, instead of selecting on the selecting section 228 an arbitrary site/region in a map displayed on the monitor 226 like in the shooting equipment communicating system 10.

Thus, the car navigation device 220 further comprises a processor section 234 for receiving on the communicating section 230 the shooting information including at least the position information transmitted from the digital camera 240 and identifying the location information to input to the retrieving section 224 based on the received shooting information.

The digital camera 240 further comprises a position information acquiring section 248 for acquiring the shooting information including at least the position information to transmit to the car navigation device 220. The digital camera 240 transmits the shooting information acquired to the car navigation device 220 via the communicating section 242.

The position information acquiring section 248 acquires position information for example when the system user has pressed a button provided on the digital camera 240.

The position information acquiring section 248 uses for example a GPS (Global Positioning System) to acquire the position information about the current position.

The shooting information transmitted from the digital camera 240 to the car navigation device 220 preferably includes, in addition to the position information, the information in the shooting direction obtained by a bearing measurement instrument provided on the digital camera 240.

The shooting equipment communicating system 20 according to the second embodiment of the invention is basically arranged as described above.

The operation of the second embodiment is described below.

The system user travels in a vehicle 210 to a destination by using a car navigation device 220, and gets off the vehicle 210 to start shooting at a shooting site. When the system user presses a specified button on the position information acquiring section 248 of the digital camera 240, the position information acquiring section 248 acquires the position information. The digital camera 240 transmits the shooting information including at least the position information acquired to the car navigation device 220 via the communicating section 242. The communicating section 230 of the car navigation device 220 receives the shooting information and transmits the shooting information to the processor section 234. The processor section 234 identifies the location information which is based on the shooting information and transmits the location information identified to the retrieving section 224.

The retrieving section 224 retrieves the region-/site-related information about the shooting site from the database section 222.

In case the data amount to be searched through by the retrieving section 224 is previously set on the selecting section 228, the retrieving section 224 searches through the region-/site-related information in the data amount set by the selecting section 228 in order of importance from the database section 222 where the region-/site-related information is stored in a hierarchical structure of ranks of importance.

It may also be preferred that the information representing the data amount to be searched through is transmitted together with the shooting information and the data amount to be searched through by the retrieving section 224 is set on the digital camera 240. Alternatively, the car navigation device 220 may determine the data amount automatically in accordance with the remaining memory capacity of the storage section 244 of the digital camera 240.

The region-/site-related information about the shooting site retrieved by the retrieving section 224 is transmitted to the digital camera 240 via the communicating section 230.

The communicating section 242 of the digital camera 240 receives the region-/site-related information about the shooting site transmitted from the car navigation device 220, and the storage section 244 stores the information.

The system user performs such processing at a shooting site and displays the region-/site-related information about the shooting site on the display of the shooting section 246 to enhance the taste, entertainment and convenience of photography shooting.

For example, it is possible to acquire the information about a shooting site at the shooting site. This upgrades the convenience. For example, in case the system user performs shooting in mountains, he/she can acquire the useful region-/site-related information about the shooting site, that is, the information about the mountains including the height of a mountain at the shooting site as well as names of trees and animals in the mountain area before starting photography shooting. This enhances the taste and entertainment of photography shooting.

Preferably, the region-/site-related information includes sound information such as the cries of animals and songs of birds so as to listen to the cries of animals and songs of birds. It is possible to acquire the name and height of a mountain to be photographed from the information about the shooting site and shooting direction.

While communications between the digital camera 240 and the car navigation device 220 are made on a wireless basis, wired communications are allowed in the vehicle 210.

During photography shooting, the region-/site-related information about the shooting site acquired may be compounded with the data on pictures taken by the shooting section 246.

When photography shooting is done by the shooting section 246, the data on pictures taken is transmitted from the communicating section 242 to the communicating section 230 of the car navigation device 220 and stored into the storage section 232.

Preferably, when the system user has dropped into a chain store such as a convenience store where an external server 260 is installed on the way to a destination, the car navigation device 220 receives on the communicating section 230 the region-/site-related information stored into the external database section 262 via the communicating section 264 and add, delete or update the region-/site-related information stored in the database section 222 of the car navigation device 220. By doing so, it is possible to acquire the detailed and up-to-date region-/site-related information stored in the external database section 262.

When the system user has dropped into a gas station or a convenience store where the external server 260 is installed on the way back home, if wishing to order printing of pictures taken, the system user may transmit to the external server 260 the data on pictures stored in the storage section 232 of the car navigation device 220 together with order data, and transfer via the external server 260 the picture data and order data to a printing agency such as a processing laboratory where an image processor and a printer to prepare prints based on picture data and order data are installed.

In this way, according to the second embodiment of the invention, it is possible to readily acquire the region-/site-related information about the shooting site used for photography shooting thus enhancing the taste, entertainment and convenience of photography shooting. Further, it is possible to acquire the region-/site-related information in the data amount which depends on the memory capacity of the storage section 244 of the digital camera 240.

We now describe a third embodiment of the invention. The third embodiment is a shooting equipment communicating system which provides the system user with desired information upon photography shooting with a camera at a destination after he/she has traveled to the destination in a vehicle.

Figure 3:
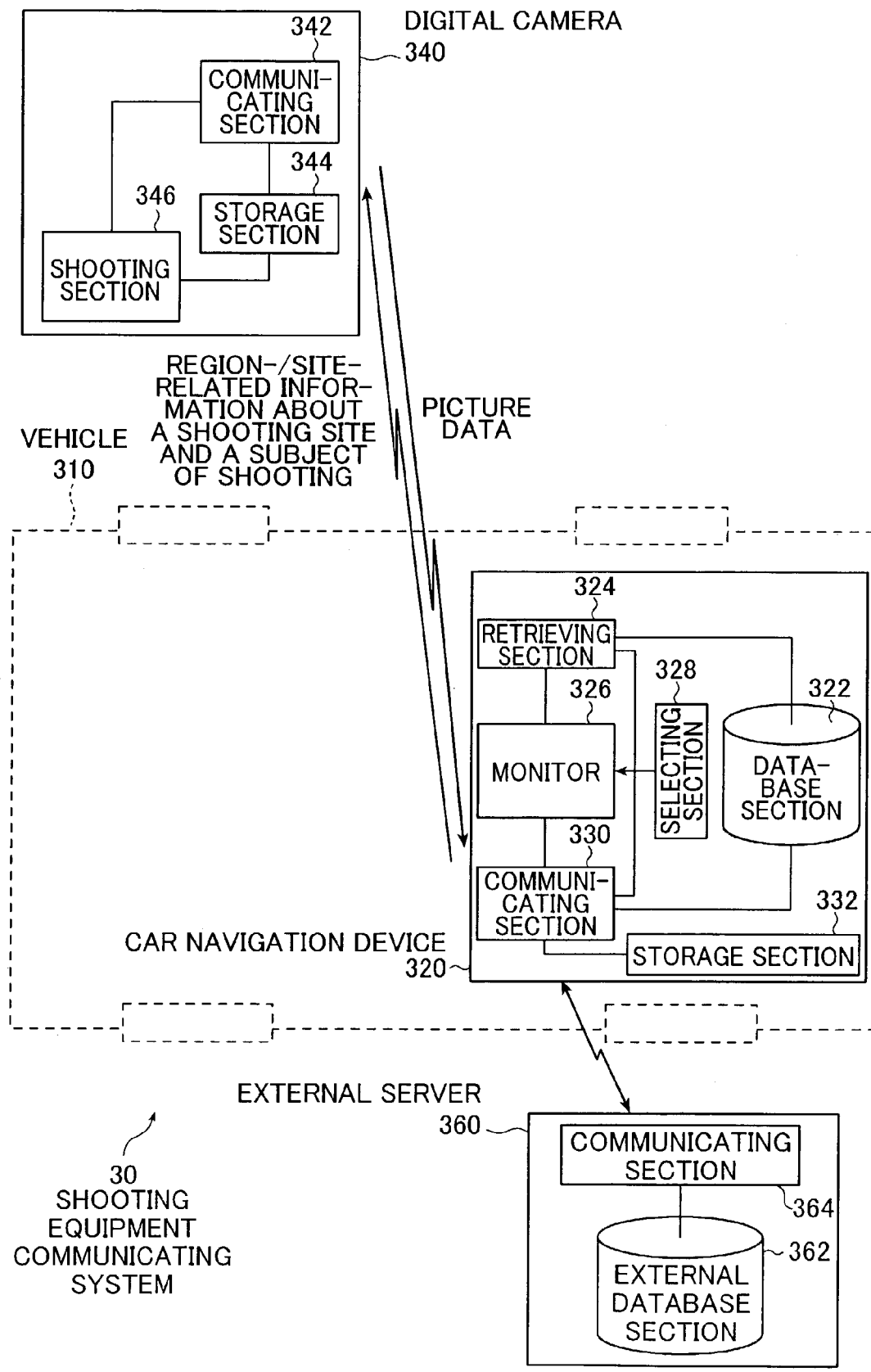
FIG. 3 is a block diagram showing the outline of an example of a shooting equipment communicating system according to a third embodiment of the invention.

FIG. 3 is an exemplary block diagram showing the outline of a car-mounted shooting equipment communicating system 30 according to the third embodiment of the invention.

The shooting equipment communicating system 30 as shown in FIG. 3 comprises a vehicle 310, a car navigation device 320, a digital camera 340 and an external server 360.

Configuration and functions of the vehicle 310, the car navigation device 320, the digital camera 340 and the external server 360 of the shooting equipment communicating system 30 as shown in FIG. 3 are generally the same as those of the vehicle 110, the car navigation device 120, the digital camera 140 and the external server 160 of the shooting equipment communicating system 10 as shown in FIG. 1, respectively. A database section 322, a retrieving section 324, a monitor 326, a selecting section 328, a communicating section 330 and a storage section 332 of the car navigation device 320 in FIG. 3 are equivalent to the database section 122, the retrieving section 124, the monitor 126, the selecting section 128, the communicating section 130 and the storage section 132 of the car navigation device 120 in FIG. 1, respectively. A communicating section 342, a storage section 344 and a shooting section 346 of the digital camera 340 in FIG. 3 are equivalent to the communicating section 142, the storage section 144 and the shooting section 146 of the digital camera 140 in FIG. 1, respectively. Thus, description on the same configurations and functions is omitted and only the difference is described below.

The shooting equipment communicating system 30 is a system to acquire the region-/site-related information about the shooting site and the subject of shooting by transmitting to the car navigation device 320 the shooting data in photography shooting, instead of selecting on the selecting section 328 an arbitrary site/region in a map displayed on the monitor 326 like in the equipment communicating system 10.

The retrieving section 324 of the car navigation device 320 further comprises a function to compare the picture data transmitted from the digital camera 340 and received by the communicating section 330 with the registered data on the picture of a subject previously taken from a specified site stored in the database section 322 in association with the shooting site information, and identify the shooting site and the subject of shooting.

The shooting equipment communicating system 30 according to the third embodiment of the invention is basically arranged as described above.

The operation of the third embodiment is described below.

The system user travels in a vehicle 310 to a destination by using a car navigation device 320, and gets off the vehicle 310 to start shooting of a subject at a shooting site. The data on pictures taken by the shooting section 346 of the digital camera 340 is transmitted to the communicating section 342 then to the car navigation device 320. The picture data may be compressed picture data as long as the subject can be identified. The communicating section 330 of the car navigation device 320 receives the picture data and transmits the data to the retrieving section 324. The retrieving section 324 compares the picture data with the registered picture data stored in the database section 322 in association with the location information, identifies the shooting site and the subject of shooting, and retrieves the region-/site-related information about the shooting site and the subject of shooting.

The subject of shooting is identified by extracting the area of the subject of shooting in the picture and performing pattern matching between the shapes of the subject photographed and the subject in the registered picture. In this practice, the car navigation device 320 recognizes the current position of the vehicle 310 so that the car navigation device 320 preferably uses this position to fetch the registered picture. Since the digital camera 340, same as the digital camera 240, comprises a position information acquiring section, it is also possible to transmit the information on the shooting site and information in the shooting direction together with picture data so as to fetch the registered picture for comparison.

In case the data amount to be searched through by the retrieving section 324 is previously set on the selecting section 328, the retrieving section 324 searches through the region-/site-related information in the set data amount in order of importance from the database section 322 where the region-/site-related information is stored in a hierarchical structure of ranks of importance.

Preferably, the information representing the data amount to be searched through is transmitted together with the picture information and the data amount to be searched through by the retrieving section 324 is set on the digital camera 340.

The region-/site-related information about the shooting site and the subject of shooting retrieved by the retrieving section 324 is transmitted to the digital camera 340 via the communicating section 330.

The communicating section 342 of the digital camera 340 receives the region-/site-related information about the shooting site and the subject of shooting transmitted from the car navigation device 320, then the storage section 344 stores the information.

The system user performs such processing in photography shooting, calls the region-/site-related information about the shooting site and the subject of shooting from the storage section 344 and displays the information obtained on the display of the shooting section 346. This enhances the taste, entertainment and convenience of photography shooting.

For example, in case the system user wishes to acquire the information on a building which he/she is going to photograph, it is possible to acquire at the shooting site the information on the building and the information on a site where the building stands, thus enhancing the convenience. For example, it is possible to acquire the information such as the name of the building, history of the building and characteristics of the building as the information about the shooting site and the subject of shooting in order to provide the system user with useful information. This adds to the taste, entertainment and convenience of photography shooting.

While communications between the digital camera 340 and the car navigation device 320 are made on a wireless basis, wired communications are allowed in the vehicle 310.

During photography shooting, the region-/site-related information about the shooting site acquired may be compounded with the data on pictures taken by the shooting section 346.

When photography shooting is done by the shooting section 346, the data on the pictures taken is transmitted from the communicating section 342 to the communicating section 330 of the car navigation device 320 and stored into the storage section 332.

Preferably, when the system user has dropped into a chain store such as a convenience store where an external server 360 is installed on the way to a destination, the car navigation device 320 receives on the communicating section 330 the region-/site-related information stored into the external database section 362 via the communicating section 364 and add, delete or update the region-/site-related information stored in the database section 322 of the car navigation device 320. By doing so, it is possible to acquire the detailed and up-to-date region-/site-related information stored in the external database section 362.

When the system user has dropped into a chain store such as a convenience store where the external server 360 is installed on the way back home, if wishing to order printing of pictures taken, the system user may transmit to the external server 360 the data on pictures stored in the storage section 332 of the car navigation device 320 together with order data, and transfer via the external server 360 the picture data and order data to a printing agency such as a processing laboratory where an image processor and a printer to prepare prints based on picture data and order data are installed.

In this way, according to the third embodiment of the invention, it is possible to readily acquire the region-/site-related information about the shooting site and the subject of shooting used in photography shooting thus enhancing the taste, entertainment and convenience of photography shooting. Further, it is possible to acquire the region-/site-related information in the data amount which depends on the memory capacity of the storage section 344 of the digital camera 340.

Comparison between picture data and the registered picture data which requires high throughput is made on the car navigation device 320 so that it is possible to acquire the information about the subject irrespective of the performance of the digital camera 340.

We now describe a fourth embodiment of the invention. The fourth embodiment is a shooting equipment communicating system which provides the system user with information used when the system user travels to a destination in a vehicle and order commodities at the destination, on the way to the destination or at the destination.

Figure 4:
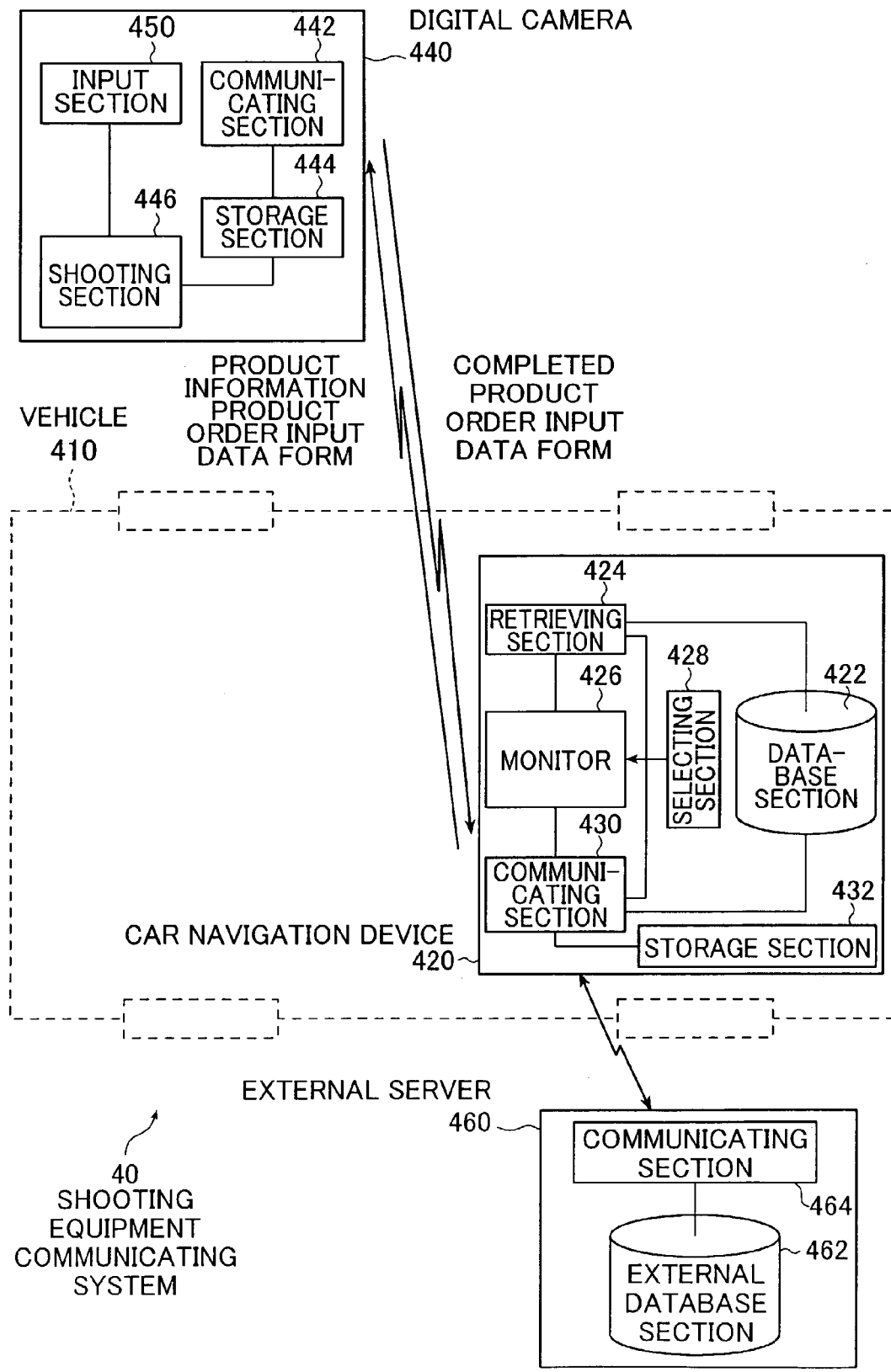
FIG. 4 is a block diagram showing the outline of an example of a shooting equipment communicating system according to a fourth embodiment of the invention.

FIG. 4 is an exemplary block diagram showing the outline of a shooting equipment communicating system 40 according to the fourth embodiment of the invention.

The shooting equipment communicating system 40 as shown in FIG. 4 comprises a vehicle 410, a car navigation device 420, a digital camera 440 and an external server 460.

Configuration and functions of the vehicle 410, the car navigation device 420, the digital camera 440 and the external server 460 of the shooting equipment communicating system 40 as shown in FIG. 4 are generally the same as those of the vehicle 110, the car navigation device 120, the digital camera 140 and the external server 160 of the shooting equipment communicating system 10 as shown in FIG. 1, respectively. A database section 422, a retrieving section 424, a monitor 426, a selecting section 428, a communicating section 430 and a storage section 432 of the car navigation device 420 in FIG. 4 are equivalent to the database section 122, the retrieving section 124, the monitor 126, the selecting section 128, the communicating section 130 and the storage section 132 of the car navigation device 120 in FIG. 1, respectively. A communicating section 442, a storage section 444 and a shooting section 446 of the digital camera 440 in FIG. 4 are equivalent to the communicating section 142, the storage section 144 and the shooting section 146 of the digital camera 140 in FIG. 1, respectively. Thus, description on the same configurations and functions is omitted and only the difference is described below.

The shooting equipment communicating system 40 is basically a system which uses a digital camera 440 to order products at a destination such as a sightseeing spot instead of using the digital camera for photography shooting, unlike the shooting equipment communicating system 10, the shooting equipment communicating system 20 and the shooting equipment communicating system 30.

Thus, the region-/site-related information stored in the database section 422 of the car navigation device 420 is product information in a region or at a site. In the database section 422 is also stored product order input data, which may be represented as an order form used for product order, on top of the product information.

The car navigation device 420 transmits the product information together with the product order input data to the digital camera 440.

The digital camera 440 further comprises an input section 450 for completing the product order input data transmitted from the car navigation device 420 by, for example, filling out the product order input data as an order form. The digital camera 440 transmits the product order input data completed on the input section 450 to the car navigation device 420.

The product information includes e.g. the picture information about the products at the destination such as a sightseeing spot, and text information about the products such as the names, characteristics and prices of the products.

The product order input data form preferably includes a program to automatically calculate the total sum of the prices of the input products when the form is completed.

The shooting equipment communicating system 40 according to the fourth embodiment of the invention is basically arranged as described above.

The operation of the fourth embodiment is described below.

The system user inputs a destination on the selecting section 428 while traveling to the destination in a vehicle 410. The system user selects regions and sites located at the destination in a map displayed on the monitor 426. When the information about the regions and sites is input as location information, the retrieving section 424 retrieves the product information corresponding to the location information from the database section 422 based on the input location information.

In case the data amount to be searched through by the retrieving section 424 is previously set on the selecting section 428, the retrieving section 424 searches through the product information in the set data amount in order of importance, the product information being stored in a hierarchical structure of ranks of importance.

The product information retrieved by the retrieving section 424 is transmitted to the digital camera 440 via the communicating section 430, together with the product order input data stored in the database 422 retrieved by the retrieving section 424.

Transmission of the product information and the product order input data is made in the vehicle 410 on the move.

The communicating section 442 of the digital camera 440 receives the product information and the product order input data transmitted from the car navigation device 420. The storage section 444 then stores the data.

The system user can perform such processing in a vehicle 410 on the way to the destination. Thus, the system user can display the product information stored in the storage section 442 on the display of the shooting section 446 to acquire the information about the products before or just after he/she has reached the destination and got off the vehicle 410.

In this embodiment, it is possible for example to acquire product information before reaching a destination and select the target products in advance. This adds to convenience.

The system user can check the products at the destination by holding them with his/her bare hand before ordering them with confidence.

The system user, if wishing to acquire the information about a product at a souvenir counter which attracts his/her attention, preferably identifies the product and obtains the information about the product by using the shooting equipment communicating system 30 according to the third embodiment.

When the product order input data is completed with order data on the input section 450, the completed product order input data is transmitted to the communicating section 442, which transmits the data to the communicating section 430 of the car navigation device 420, and the data is stored in the storage section 432. Transmission to the car navigation device 420 may take place after the system user has returned to the vehicle 410 or for example at a souvenir counter.

It is also preferable that, when the system user has dropped into a chain store such as a convenience store where an external server 460 is installed on the way to a destination in a vehicle 410, the product information stored in an external database section 462 is received on the communicating section 430 via a communicating section 464 so as to carry out an addition to, or deletion or update of the product information stored in the database section 422 of the car navigation device 420. By doing so, it is possible to acquire the detailed and up-to-date region-/site-related information stored in the external database section 462.

When the system user has dropped into a gas station or a convenience store where the external server 460 is installed on the way back home, the system user may transmit to the external server 460 the completed product order input data stored in the storage section 432 of the car navigation device 420 to have the data transferred via the external server 460 to a commodity ordering center which makes orders of commodities.

In this way, according to the fourth embodiment of the invention, it is possible to readily acquire the product information used for commodity ordering. Further, it is possible to acquire the product information in the data amount which depends on the memory capacity of the storage section 444 of the digital camera 440.

In the shooting equipment communicating systems 10, 20, 30 and 40 as shown in FIGS. 1 through 4, the respective database sections 122, 222, 322 and 422 of the car navigation devices 120, 220, 320 and 420 as well as the respective storage sections 144, 244, 344 and 444 of the digital cameras 140, 240, 340 and 440 contain various kinds of contents information stored therein, including data on taken pictures and region-/site-related information concerning a destination or a place of photography shooting. It is preferable to provide each of the database sections and storage sections as above with a storage control section for controlling storage substance which is stored in the database or storage section of interest depending on its limited storage capacity.

In the following is described a typical case where the database section 122 of the car navigation device 120 and the storage section 144 of the digital camera 140 in the shooting equipment communicating system 10 as shown in FIG. 1 are provided with storage control sections 123 and 145, respectively, but the invention is not limited thereto. As a matter of course, the database sections 222, 322 and 422 of the car navigation device 220, 320 and 420 as well as the storage sections 244, 344 and 444 of the digital cameras 240, 340 and 440 in the shooting equipment communicating systems 20, 30 and 40 as shown in FIGS. 2 through 4 may also be provided with storage control sections, respectively, and function in a similar manner.

In the digital camera 140 in the shooting equipment communicating system 10 as shown in FIG. 1, the storage substance stored in the storage section 144 is controlled by the storage control section 145 as below.

The digital camera 140 receives various kinds of contents information from the car navigation device 120 and stores such information in the storage section 144. The storage section 144 may be an internal memory of the digital camera 140 or a memory card.

Contents information is fetched in the digital camera 140 from the car navigation device 120 in itself, for example, the database section 122 thereof, or from an external server or an Internet site via the car navigation device 120.

It is beyond question that the contents information includes the region-/site-related information as stated before but information which is independent of region or site is also possible. The contents information is not particularly limited as long as it can be reproduced or executed on the digital camera 140 and may be a moving picture, a still picture, a voice, a text, a program (software game), or the like.

The contents information in the storage section 144 of the digital camera 140 is deleted as the photography shooting with the digital camera 140 proceeds, to thereby provide a free space for storing data on taken pictures.

In this respect, as a first example, the structure of the contents information is made hierarchical between the most detailed information and the roughest information, with the most detailed information being deleted first.

As a second example, the information about a region or site through which a means for transport such as the vehicle 110 has already passed is deleted, which is effective particularly when the digital camera 140 has a GPS function.

As a third example, if the contents information is a software game, cleared scenes of the game (contents) are deleted.

It is desirable to leave historical information presenting the substance and the availability of the stored contents in the digital camera 140, for example, in the storage section 144 thereof.

After the digital camera 140 transfers the data on taken pictures to the car navigation device 120, contents information is newly stored in the storage section 144.

If the contents which are sequential to the preceding contents in substance are to be newly stored, it is desirable to select contents in view of the availability of the preceding contents presented by the historical information in the digital camera 140.

In the car navigation device 120 in the shooting equipment communicating system 10 as shown in FIG. 1, the storage substance stored in the database section 122 is controlled by the storage control section 123 as below.

Various kinds of contents information are fetched from an external server (Internet site, database, and so forth) and stored in the car navigation device 120 in itself, namely the database section 122 thereof.

The stored contents information is deleted depending on the storage capacity for the original information (data on taken pictures, region-/site-related information acquired at a destination or a place of photography shooting, and so forth) which is included in the contents information. For instance, the contents information concerning the sites through which the system user has already passed based on his/her tour schedule is deleted earlier.

In the free storage area (free space) of the database section 122 thus provided, the data on taken pictures received from the digital camera 140 is stored.

The data on taken pictures in the database section 122 is transferred to a processing laboratory via an external server or the Internet and then deleted. Thereafter, various kinds of contents information are fetched from the outside and stored again.

Similar to the case of the digital camera 140 as described above, it is desirable to take the availability of the preceding contents into account by making use of the information on contents history left in the car navigation device 120.

It should be noted that the data to be deleted, that is to say, the contents information and data on taken pictures to be deleted, in the database section 122 of the car navigation device 120 or the storage section 144 of the digital camera 140 in the shooting equipment communicating system 10 as shown in FIG. 1 need not be deleted completely but may be reconstructed at a higher compression ratio so as to increase the free storage space.

Figure 5:
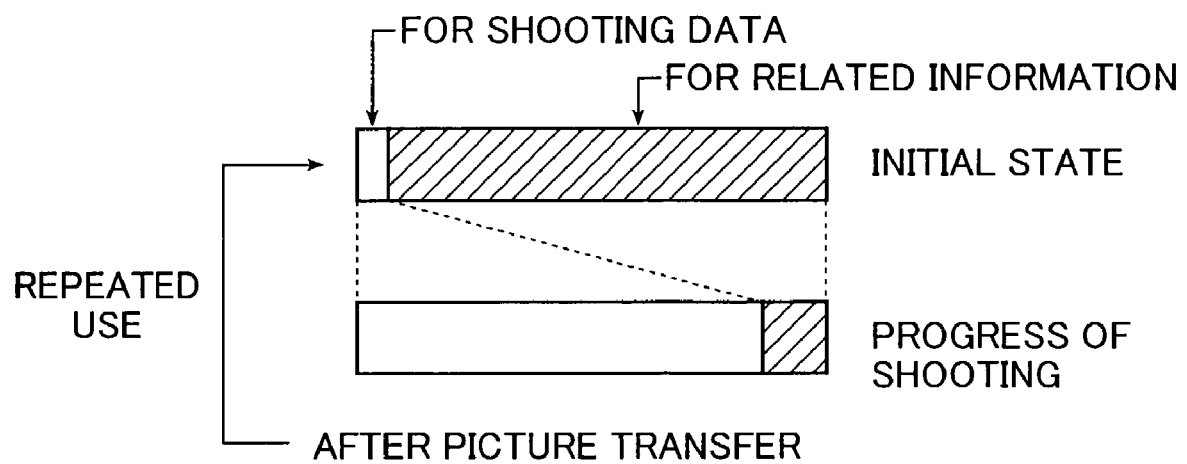
FIG. 5 is a diagram illustrating a typical control of storage substance by storage control sections in a database section and a storage section of a shooting equipment communicating system according to the invention.

As described above, in the car navigation device 120 and the digital camera 140 of the shooting equipment communicating system 10 shown in FIG. 1, the contents stored in the database section 122 and the storage section 144 are controlled as shown in FIG. 5 by the storage control sections 123 and 145, respectively.

To be more specific, most of the storage capacity of the database section 122 or the storage section 144 in their initial state is occupied by the contents information, which forms an area for related information. As photography shooting progresses, the contents information is deleted and the area for related information is decreased, whereas data on pictures taken is stored and an area for shooting data is increased. After photography shooting progressed to some extent, the data on the pictures taken is transferred outside to return the area for shooting data to a space area, for example to the initial state shown in FIG. 5. The database section 122 or the storage section 144 can be thus repeatedly utilized.

It is possible to make full use of the memory capacity by controlling the contents stored in the database section 122 and the storage section 144 of the car navigation device 120 and the digital camera 140 as shown in FIG. 5 in the manner described above by means of the storage control sections 123 and 145. The amount of a variety of available contents information can be thus increased.

In the present invention, system users (users) may exchange taken pictures or contents information with one another.

When a taken picture (including a shooting position and further bearing information) is registered with the external server 160 with the publication-permitting flag being on, the taken picture is transferred from the car navigation device 120 to the external database section 162 of the external server 160 as in a hotel, a gas station or a convenience store where the vehicle 110 is parked. The taken picture is held in the database section 162 so that third parties can use it.

The taken picture may be a still picture or a moving picture. The taken picture may include a voice or text message.

The contents information can also be processed in the same manner as the taken picture.

The taken picture may be a picture taken by a user with the digital camera 140 or a picture taken with a car-mounted camera. The picture taken with the car-mounted camera indicates for example a scenic drive course or the like.

The contents information may also include information on the time required to travel, which can be utilized instead of the traffic jam information.

When reference is made to a registered picture or registered contents information, some profits may be given to providers by counting the cumulative number of reference.

In addition, communications may be directly exchanged between vehicles during parking (or between car navigation systems).

As a result, the system user side can make reference to the latest picture taken in each site for preliminary checking or the like. Further, there is an effect in that the system users can exchange not only the taken picture but also a comment, an advertisement or other information with one another.

There is another effect in that providers provided with external servers and external databases do not need to collect data on the latest pictures.

User interfaces used for the purpose of determining the destination based on the shooting scene are as follows:

Firstly, a specified site is indicated on a (wide-area) map of the car navigation device 120 by point pick. The frequencies at which all the tourists were shot for each place and/or for each time period may be displayed on the map in a superposed manner. For example, the latest picture taken by any photographer is displayed based on the counting in a server of a hotel.

Secondly, when pictures taken in several sites are selected in the process described above, the car navigation device 120 is used to estimate the time required to take the pictures while visiting all these sites and the optimal route to take. For example, the total time required for traveling by car or on foot, or for standard photography shooting (appreciation) can be estimated. The information on a car parking space, distance traveled by a vehicle from a car parking space to a shooting site, or time required for traveling from the car parking space to the shooting site may also be displayed.

Thirdly, once a traveling route is determined, a shooting point midway in the traveling route may also be presented.

Fourthly, shooting site/direction can also be displayed for each taken picture on a more detailed map than in the first case described above. It is also possible to display information on a camera used in photography shooting.

The shooting equipment communicating system of the invention may be a system wherein a plurality of portable shooting units communicate with a single mobile communications unit and all the portable shooting units acquire information used for photography shooting etc., as well as a system wherein a single portable shooting unit communicates with a single mobile communications unit as described in the above examples according to the respective embodiments.

It should be understood that the shooting equipment communicating system according to the present invention is by no means limited to the foregoing embodiments and that various improvements and modifications are possible without departing from the spirit and scope of the invention.

As described on the foregoing pages, the shooting equipment communicating system of the invention allows information used for photography shooting or commodity ordering to be easily acquired. In particular, it allows the subject information used for photography shooting at a sightseeing spot as the destination to be readily acquired, thus enhancing the taste, entertainment and convenience of the photography shooting.

Moreover, according to the present invention, the memory capacities of a database section and a storage section of portable shooting equipment and mobile communications equipment can be fully utilized, resulting in the increase in amount of various kinds of contents information available.

What is claimed is:

1. A shooting equipment communicating system including portable shooting equipment and mobile communications equipment which is moved together with the portable shooting equipment and communicates with said portable shooting equipment, wherein:

said mobile communications equipment comprises:
a database section for storing map data, location information about regions and sites included in a map represented by the map data, and region-/site-related information comprising descriptive information about the regions and the sites identified by the location information, the region-/site-related information being other than the map data and the location information; and
a retrieving section for retrieving the relevant region-/site-related information from the database section depending on the input location information; and transmits the region-/site-related information retrieved by the retrieving section to said portable shooting equipment; and said portable shooting equipment comprises a shooting section for performing photography shooting of a subject and a storage section for receiving and storing the region-/site-related information retrieved by said retrieving section; and said shooting section has a display for displaying at least one of the subject taken and information selected from the region-/site-related information stored in said storage section; and wherein the retrieving section retrieves the relevant region-/site-related information in order of importance; and wherein the database section stores the region-/site-related information in a hierarchical structure of ranks of importance.

2. The shooting equipment communicating system according to claim 1, wherein:

said portable shooting equipment further comprises a position information acquiring section for acquiring information on a current position and transmits acquired position information at least as shooting information to said mobile communications equipment when the photography shooting is performed with said shooting section; and said mobile communications equipment further comprises a processor section for identifying a shooting site on the photography shooting with said shooting section by using said shooting information received and said map data and inputting the shooting site as said location information to said retrieving section, wherein said retrieving section retrieves the region-/site-related information from said database section depending on the location information about said shooting site input from the processor section and transmits the region-/site-related information about said shooting site retrieved to said portable shooting equipment.

3. The shooting equipment communicating system according to claim 1, wherein said portable shooting equipment transmits data on pictures taken by said shooting section to said mobile communications equipment, and said mobile communications equipment stores in said database section data on pictures of a subject of shooting previously photographed from a specified site as registered picture data in association with said location information, identifies the shooting site and the subject of shooting on the photography shooting with said shooting section by comparing said data on pictures taken with said registered picture data, retrieves on said retrieving section the region-/site-related information about the identified shooting site and subject of shooting, and transmits the information retrieved to said portable shooting equipment.

4. The shooting equipment communicating system according to claim 1, wherein said mobile communications equipment communicates with an external server, said region-/site-related information is product information in said region or at said site, said mobile communications equipment transmits product order input data to said portable shooting equipment together with said product information, and on completion of the product order input data received, said portable shooting equipment returns the product order input data to said mobile communications equipment, and said mobile communications equipment transfers the completed product order input data to said external server.

5. The shooting equipment communicating system according to claim 4, wherein said mobile communications equipment further comprises a storage section, said portable shooting equipment transmits said data on pictures taken by said shooting section or said completed product order input data to said mobile communications equipment, and said mobile communications equipment stores said data on pictures taken by said shooting section or said completed product order input data in said storage section.

6. The shooting equipment communicating system according to claim 5, wherein said mobile communications equipment, transfers said data on pictures or said completed product order input data stored in said storage section to said external server.

7. The shooting equipment communicating system according to claim 1, wherein said mobile communications equipment communicates with an external server comprising an external database section and performs addition to, or deletion of, or update of said region-/site-related information stored in said database section, based on information contained in said external database section that is transmitted from the external server.

8. The shooting equipment communicating system according to claim 1, wherein said mobile communications equipment is car-mounted communications equipment or portable communications equipment which is capable of communicating with said portable shooting equipment.

9. The shooting equipment communicating system according to claim 8, wherein said car-mounted communications equipment is a car navigation device and said portable communications equipment is a cell phone, hand-held computer or PDA (personal digital assistant) with a navigation function.

10. The shooting equipment communicating system according to claim 1, wherein said portable shooting equipment is adapted for a short-distance communication with said mobile communications equipment.

11. The shooting equipment communicating system according to claim 1, wherein said portable shooting equipment is moved together with said mobile communications equipment or moved as being kept within a range in which the short-distance communication with said mobile communications equipment is feasible.

12. The shooting equipment communicating system according to claim 1, wherein said portable shooting equipment further comprises a first storage control section for controlling said storage section such that contents information, which is stored in the database section of said mobile communications equipment or acquired by said mobile communications equipment from the external server through communication, is received from said mobile communications equipment and stored in said storage section depending on a storage capacity of said storage section and that said contents information stored in said storage section depending on the storage capacity of said storage section is deleted or compressed at a high compression ratio to store over again as said photography shooting of a subject with said shooting section of said portable shooting equipment proceeds, so that a free space for storing data on taken pictures, which is acquired by performing said photography shooting of a subject, is provided.

13. The shooting equipment communicating system according to claim 12, wherein said first storage control section controls said storage section such that said data on taken pictures stored in said storage section is deleted or compressed at high compression ratio to store over again after being transmitted to said mobile communications equipment so as to store new contents information in said storage section.

14. The shooting equipment communicating system according to claim 1, wherein said mobile communications equipment further comprises a second storage control section for controlling said database section such that contents information acquired from an external server through communication is stored in said database section depending on a storage capacity of said database section and that said contents information stored in said database section depending on the storage capacity of said database section is deleted or compressed at a high compression ratio to store over again as said mobile communications equipment is moved, so that a free space for storing data on taken pictures received from said portable shooting equipment and/or contents information received from the external server is provided.

15. The shooting equipment communicating system according to claim 14, wherein said second storage control section controls said database section such that said data on taken pictures stored in said database section is deleted or compressed at high compression ratio to store over again after being transmitted to the external server so as to store new contents information in said database section.

16. The shooting equipment communicating system according to claim 1, wherein said region-/site-related information comprises descriptive information about natural objects, buildings, sightseeing places and events in the regions and sites identified by the location information.

17. The shooting equipment communicating system according to claim 1, wherein the database section and the retrieving section are integrally combined in said mobile communications equipment.

* * * * *